US009317758B2

(12) United States Patent
Falb

(10) Patent No.: US 9,317,758 B2
(45) Date of Patent: Apr. 19, 2016

(54) VEHICLE IMAGING SYSTEM AND METHOD FOR DISTINGUISHING REFLECTIVE OBJECTS FROM LIGHTS OF ANOTHER VEHICLE

(71) Applicant: Gentex Corporation, Zeeland, MI (US)

(72) Inventor: David M Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 22 days.

(21) Appl. No.: 14/462,694

(22) Filed: Aug. 19, 2014

(65) Prior Publication Data
US 2015/0048738 A1  Feb. 19, 2015

Related U.S. Application Data

(60) Provisional application No. 61/867,358, filed on Aug. 19, 2013.

(51) Int. Cl.
*B60Q 1/14* (2006.01)
*G06K 9/00* (2006.01)

(52) U.S. Cl.
CPC ........ *G06K 9/00825* (2013.01); *B60Q 2300/41* (2013.01); *B60Q 2300/42* (2013.01)

(58) Field of Classification Search
CPC ...... B60Q 1/14; B60Q 1/143; B60Q 2300/42; B60Q 2300/41; B60Q 1/1423; B60Q 1/02; B60Q 1/04
USPC .......... 315/76, 77, 80, 82, 291; 362/459, 460, 362/464, 494; 701/1, 28, 36, 49, 301
See application file for complete search history.

(56) References Cited

U.S. PATENT DOCUMENTS 2,131,888 A   10/1938   Harris
2,632,040 A    3/1953   Rabinow
(Continued)

FOREIGN PATENT DOCUMENTS

DE    2946561       5/1981
EP    1504957 A2    9/2005
(Continued)

OTHER PUBLICATIONS

Patent Cooperation Treaty, International Searching Authority, International Search Report, Written Opinion of the International Searching Authority and Notification of Transmittal, Feb. 5, 6 Pages.
(Continued)

*Primary Examiner* — Thai Pham
(74) *Attorney, Agent, or Firm* — Price Heneveld LLP; Scott P. Ryan

(57) ABSTRACT

An imaging system is provided for a vehicle. The system includes an imager for imaging a forward external scene and generating image data corresponding to the acquired images; and a processor for receiving and analyzing the image data to detect a light source. When a light source is detected, the processor generates a control signal to control exterior lights of the vehicle to temporarily modulate an illumination pattern projected from the exterior lights to have a particular modulation pattern. After generating the control signal, the processor analyzes the image data subsequently received to detect whether the light source has the modulation pattern of the exterior lights. If the light source does have the modulation pattern, the processor determines that the light source is a reflective object and not a light of another vehicle. Otherwise, the processor determines that the light source may be a light of another vehicle.

20 Claims, 3 Drawing Sheets

(56) References Cited

U.S. PATENT DOCUMENTS

| | | | |
|---|---|---|---|
| 2,827,594 | A | 3/1958 | Rabinow |
| 3,179,845 | A | 4/1965 | Kulwiec |
| 3,581,276 | A | 5/1971 | Newman |
| 3,663,819 | A | 5/1972 | Hicks et al. |
| 4,139,801 | A | 2/1979 | Linares |
| 4,151,526 | A | 4/1979 | Hinachi et al. |
| 4,236,099 | A | 11/1980 | Rosenblum |
| 4,258,979 | A | 3/1981 | Mahin |
| 4,286,308 | A | 8/1981 | Wolff |
| 4,357,558 | A | 11/1982 | Massoni et al. |
| 4,376,909 | A | 3/1983 | Tagami et al. |
| 4,479,173 | A | 10/1984 | Rumpakis |
| 4,599,544 | A | 7/1986 | Martin |
| 4,645,975 | A | 2/1987 | Meitzler et al. |
| 4,665,321 | A | 5/1987 | Chang et al. |
| 4,692,798 | A | 9/1987 | Seko et al. |
| 4,716,298 | A | 12/1987 | Etoh |
| 4,727,290 | A | 2/1988 | Smith et al. |
| 4,768,135 | A | 8/1988 | Kretschmer et al. |
| 4,862,037 | A | 8/1989 | Farber et al. |
| 4,891,559 | A | 1/1990 | Matsumoto et al. |
| 4,930,742 | A | 6/1990 | Schofield et al. |
| 4,934,273 | A | 6/1990 | Endriz |
| 4,967,319 | A | 10/1990 | Seko |
| 5,008,946 | A | 4/1991 | Ando |
| 5,036,437 | A | 7/1991 | Macks |
| 5,072,154 | A | 12/1991 | Chen |
| 5,086,253 | A | 2/1992 | Lawler |
| 5,096,287 | A | 3/1992 | Kakinami et al. |
| 5,124,549 | A | 6/1992 | Michaels et al. |
| 5,166,681 | A | 11/1992 | Bottesch et al. |
| 5,182,502 | A | 1/1993 | Slotkowski et al. |
| 5,187,383 | A | 2/1993 | Taccetta et al. |
| 5,235,178 | A | 8/1993 | Hegyi |
| 5,329,206 | A | 7/1994 | Slotkowski et al. |
| 5,347,261 | A | 9/1994 | Adell |
| 5,347,459 | A | 9/1994 | Greenspan et al. |
| 5,355,146 | A | 10/1994 | Chiu et al. |
| 5,379,104 | A | 1/1995 | Takao |
| 5,396,054 | A | 3/1995 | Krichever et al. |
| 5,402,170 | A | 3/1995 | Parulski et al. |
| 5,416,318 | A | 5/1995 | Hegyi |
| 5,426,294 | A | 6/1995 | Kobayashi et al. |
| 5,428,464 | A | 6/1995 | Silverbrook |
| 5,430,450 | A | 7/1995 | Holmes |
| 5,434,407 | A | 7/1995 | Bauer et al. |
| 5,451,822 | A | 9/1995 | Bechtel et al. |
| 5,452,004 | A | 9/1995 | Roberts |
| 5,471,515 | A | 11/1995 | Fossum et al. |
| 5,475,441 | A | 12/1995 | Parulski et al. |
| 5,481,268 | A | 1/1996 | Higgins |
| 5,483,346 | A | 1/1996 | Butzer |
| 5,485,155 | A | 1/1996 | Hibino |
| 5,508,592 | A | 4/1996 | Lapatovich et al. |
| 5,537,003 | A | 7/1996 | Bechtel et al. |
| 5,541,724 | A | 7/1996 | Hoashi |
| 5,550,677 | A | 8/1996 | Schofield et al. |
| 5,554,912 | A | 9/1996 | Thayer et al. |
| 5,574,463 | A | 11/1996 | Shirai et al. |
| 5,587,929 | A | 12/1996 | League et al. |
| 5,592,146 | A | 1/1997 | Kover, Jr. |
| 5,614,788 | A | 3/1997 | Mullins et al. |
| 5,621,460 | A | 4/1997 | Hatlestad et al. |
| 5,660,454 | A | 8/1997 | Mori et al. |
| 5,666,028 | A | 9/1997 | Bechtel et al. |
| 5,684,473 | A | 11/1997 | Hibino et al. |
| 5,707,129 | A | 1/1998 | Kobayashi |
| 5,710,565 | A | 1/1998 | Shirai et al. |
| 5,714,751 | A | 2/1998 | Chen |
| 5,715,093 | A | 2/1998 | Schierbeek et al. |
| 5,736,816 | A | 4/1998 | Strenke et al. |
| 5,751,832 | A | 5/1998 | Panter et al. |
| 5,781,105 | A | 7/1998 | Bitar et al. |
| 5,786,787 | A | 7/1998 | Eriksson et al. |
| 5,796,094 | A | 8/1998 | Schofield et al. |
| 5,798,727 | A | 8/1998 | Shirai et al. |
| 5,811,888 | A | 9/1998 | Hsieh |
| 5,812,321 | A | 9/1998 | Schierbeek et al. |
| 5,835,613 | A | 11/1998 | Breed et al. |
| 5,837,994 | A | 11/1998 | Stam et al. |
| 5,841,126 | A | 11/1998 | Fossum et al. |
| 5,845,000 | A | 12/1998 | Breed et al. |
| 5,867,214 | A | 2/1999 | Anderson et al. |
| 5,877,897 | A | 3/1999 | Schofield et al. |
| 5,905,457 | A | 5/1999 | Rashid |
| 5,912,534 | A | 6/1999 | Benedict |
| 5,923,027 | A | 7/1999 | Stam et al. |
| 5,942,853 | A | 8/1999 | Piscart |
| 5,990,469 | A | 11/1999 | Bechtel et al. |
| 6,008,486 | A | 12/1999 | Stam et al. |
| 6,018,308 | A | 1/2000 | Shirai |
| 6,049,171 | A | 4/2000 | Stam et al. |
| 6,097,023 | A | 8/2000 | Schofield et al. |
| 6,102,546 | A | 8/2000 | Carter |
| 6,130,421 | A | 10/2000 | Bechtel et al. |
| 6,130,448 | A | 10/2000 | Bauer et al. |
| 6,140,933 | A | 10/2000 | Bugno et al. |
| 6,144,158 | A | 11/2000 | Beam |
| 6,166,698 | A | 12/2000 | Turnbull et al. |
| 6,184,781 | B1 | 2/2001 | Ramakesavan |
| 6,255,639 | B1 | 7/2001 | Stam et al. |
| 6,281,632 | B1 | 8/2001 | Stam et al. |
| 6,329,925 | B1 | 12/2001 | Skiver et al. |
| 6,349,782 | B1 | 2/2002 | Sekiya et al. |
| 6,356,376 | B1 | 3/2002 | Tonar et al. |
| 6,379,013 | B1 | 4/2002 | Bechtel et al. |
| 6,396,040 | B1 | 5/2002 | Hill |
| 6,396,397 | B1 | 5/2002 | Bos et al. |
| 6,403,942 | B1 | 6/2002 | Stam |
| 6,429,594 | B1 | 8/2002 | Stam et al. |
| 6,442,465 | B2 | 8/2002 | Breed et al. |
| 6,443,602 | B1 | 9/2002 | Tanabe et al. |
| 6,465,962 | B1 | 10/2002 | Fu et al. |
| 6,469,739 | B1 | 10/2002 | Bechtel et al. |
| 6,483,438 | B2 | 11/2002 | DeLine et al. |
| 6,491,416 | B1 | 12/2002 | Strazzanti |
| 6,507,779 | B2 | 1/2003 | Breed et al. |
| 6,550,943 | B2 | 4/2003 | Strazzanti |
| 6,553,130 | B1 | 4/2003 | Lemelson et al. |
| 6,558,026 | B2 | 5/2003 | Strazzanti |
| 6,559,435 | B2 | 5/2003 | Schofield et al. |
| 6,587,573 | B1 | 7/2003 | Stam et al. |
| 6,593,698 | B2 | 7/2003 | Stam et al. |
| 6,611,610 | B1 | 8/2003 | Stam et al. |
| 6,617,564 | B2 | 9/2003 | Ockerse et al. |
| 6,631,316 | B2 | 10/2003 | Stam et al. |
| 6,677,986 | B1 | 1/2004 | Pöchmüller |
| 6,690,268 | B2 * | 2/2004 | Schofield ................ B60C 23/00 340/425.5 |
| 6,728,393 | B2 | 4/2004 | Stam et al. |
| 6,772,057 | B2 | 8/2004 | Breed et al. |
| 6,774,988 | B2 | 8/2004 | Stam et al. |
| 6,824,281 | B2 | 11/2004 | Schofield et al. |
| 6,861,809 | B2 | 3/2005 | Stam |
| 6,902,307 | B2 | 6/2005 | Strazzanti |
| 6,913,375 | B2 | 7/2005 | Strazzanti |
| 6,928,180 | B2 | 8/2005 | Stam et al. |
| 6,946,978 | B2 | 9/2005 | Schofield |
| 6,999,004 | B2 | 2/2006 | Comaniciu et al. |
| 7,012,543 | B2 | 3/2006 | Deline et al. |
| 7,038,577 | B2 | 5/2006 | Pawlicki et al. |
| 7,049,945 | B2 | 5/2006 | Breed et al. |
| 7,255,465 | B2 | 8/2007 | Deline et al. |
| 7,262,406 | B2 | 8/2007 | Heslin et al. |
| 7,265,342 | B2 | 9/2007 | Heslin et al. |
| 7,311,428 | B2 | 12/2007 | Deline et al. |
| 7,321,112 | B2 | 1/2008 | Stam et al. |
| 7,417,221 | B2 | 8/2008 | Creswick et al. |
| 7,446,650 | B2 | 11/2008 | Scholfield et al. |
| 7,467,883 | B2 | 12/2008 | Deline et al. |
| 7,468,651 | B2 | 12/2008 | Deline et al. |
| 7,526,103 | B2 | 4/2009 | Schofield et al. |
| 7,533,998 | B2 | 5/2009 | Schofield et al. |
| 7,565,006 | B2 | 7/2009 | Stam et al. |

(56) References Cited

U.S. PATENT DOCUMENTS

| | | | |
|---|---|---|---|
| 7,567,291 B2 | 7/2009 | Bechtel et al. |
| 7,575,348 B2 | 8/2009 | Hasegawa |
| 7,653,215 B2 | 1/2010 | Stam |
| 7,658,521 B2 | 2/2010 | Deline et al. |
| 7,683,326 B2 | 3/2010 | Stam et al. |
| 7,708,434 B2 | 5/2010 | Moizard et al. |
| 7,719,408 B2 | 5/2010 | Deward et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,045,760 B2 | 10/2011 | Stam et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,203,443 B2 | 6/2012 | Bos et al. |
| 8,217,830 B2 | 7/2012 | Lynam |
| 8,222,588 B2 | 7/2012 | Schofield et al. |
| 8,258,433 B2 | 9/2012 | Byers et al. |
| 8,289,142 B2 | 10/2012 | Pawlicki et al. |
| 8,289,430 B2 | 10/2012 | Bechtel et al. |
| 8,325,028 B2 | 12/2012 | Schofield et al. |
| 8,492,698 B2 | 7/2013 | Schofield et al. |
| 8,543,254 B1 | 9/2013 | Schut et al. |
| 8,718,899 B2 | 5/2014 | Schwindt et al. |
| 2002/0040962 A1 | 4/2002 | Schofield et al. |
| 2003/0202357 A1 | 10/2003 | Strazzanti |
| 2004/0145905 A1 | 7/2004 | Strazzanti |
| 2007/0273764 A1 | 11/2007 | Yamada et al. |
| 2008/0044062 A1 | 2/2008 | Stam et al. |
| 2008/0192132 A1 | 8/2008 | Bechtel et al. |
| 2008/0294315 A1 | 11/2008 | Breed |
| 2010/0213846 A1* | 8/2010 | Thomas | B60Q 1/1423 315/82 |
| 2011/0285982 A1 | 11/2011 | Breed |
| 2012/0072080 A1 | 3/2012 | Jeromin et al. |
| 2013/0028473 A1 | 1/2013 | Hilldore et al. |
| 2013/0096777 A1 | 4/2013 | Schofield et al. |
| 2013/0131922 A1* | 5/2013 | Ogata | B60Q 1/143 701/36 |
| 2014/0036080 A1 | 2/2014 | Schut et al. |
| 2014/0247351 A1 | 9/2014 | Amaya et al. |

FOREIGN PATENT DOCUMENTS

| | | |
|---|---|---|
| EP | 2508392 | 10/2012 |
| FR | 2641237 | 7/1990 |
| FR | 2726144 | 4/1996 |
| GB | 2313973 | 12/1997 |
| JP | 5744541 | 3/1982 |
| JP | 6015237 | 1/1985 |
| JP | 62131837 | 6/1987 |
| JP | 01233129 | 9/1989 |
| JP | 5139203 | 6/1993 |
| JP | 5342901 | 12/1993 |
| JP | 06151067 | 5/1994 |
| JP | 06267304 | 9/1994 |
| JP | 6276524 | 9/1994 |
| JP | 6295601 | 10/1994 |
| JP | 6321007 | 11/1994 |
| JP | 732936 | 2/1995 |
| JP | 747878 | 2/1995 |
| JP | 7052706 | 2/1995 |
| JP | 769125 | 3/1995 |
| JP | 8166221 | 6/1996 |
| JP | 08221700 | 8/1996 |
| JP | 2010020483 | 1/2010 |
| WO | 8605147 | 9/1986 |
| WO | 9735743 | 10/1997 |
| WO | 9843850 | 10/1998 |
| WO | 9947396 | 10/1999 |
| WO | 0022881 | 4/2000 |
| WO | WO02013081162 | 6/2013 |

OTHER PUBLICATIONS

Christopher M. Kormanyos, "SAE Paper No. 980003 entitled "HID System with Adaptive Vertical AIM Control"," p. 13-18.

J.P. Lowenau et al, "SAE Paper No. 980007 entitled "Adaptive Light Control—A New Light Concept Controlled by Vehicle Dynamics and Navigation"," p. 33-38.

Franz-Josef Kalze, "SAE Paper No. 980005 entitled "Xenon Light for Main and Dipped Beam"," p. 23-26.

Tohru Shimizu et al, (SAE Paper No. 980322 entitled "Development of PWM DRL with Low RF Emissions and Low Heat", p. 113-117.

International Searching Authority, Patent Cooperation Treaty, International Search Report and Written Opinion, Sep. 12, 2013, 6 pages.

International Searching Authority, Patent Cooperation Treaty, International Search Report and Written Opinion, Dec. 25, 2014, 6 pages.

JP Abstract of Patent No. 60-015237, "Headlight Device," (Jan. 25, 1985).

JP Abstract of Patent No. 01233129 A, "Optical Axis Changing Device for Illuminating Lamp," (Sep. 18, 1989).

JP Abstract of Patent No. 5342901, "Projection headlamp for vehicles," p. 1.

JP Abstract for Patent No. 6321007, "Vehicular Dazzle Sensor," p. 1.

JP Abstract of Patent No. 08221700 A, "Stop Lamp Recognition Device," p. 1.

JP Abstract of Publication No. 2010-020483, "Vehicle Detection Device, Vehicle Detection Program and Light Controller," p. 1.

\* cited by examiner

VEHICLE IMAGING SYSTEM AND METHOD FOR DISTINGUISHING REFLECTIVE OBJECTS FROM LIGHTS OF ANOTHER VEHICLE

CROSS-REFERENCE TO RELATED APPLICATION

This application claims priority to and the benefit under 35 U.S.C. §119(e) of U.S. Provisional Patent Application No. 61/867,358, filed on Aug. 19, 2013, entitled "SYSTEM AND METHOD FOR CONTROLLING EXTERIOR VEHICLE LIGHTS TO PULSE AND THEREBY DISTINGUISH REFLECTIVE OBJECTS FROM HEADLAMPS," the entire disclosure of which is hereby incorporated herein by reference.

FIELD OF THE INVENTION

The present invention generally relates to a system and method for imaging and detecting objects in a scene forward of a vehicle.

SUMMARY OF THE INVENTION

According to one aspect of the present invention, an imaging system is provided for a vehicle. The imaging system comprises: an imager configured to image a scene external and forward of the vehicle and to generate image data corresponding to the acquired images; and a processor configured to receive and analyze the image data to detect the presence of a light source and to identify whether such light source is a light of another vehicle, wherein, when a light source is detected, the processor is configured to generate a signal that is used to control exterior lights of the vehicle to temporarily modulate at least a portion of an illumination pattern projected from the exterior lights to have a particular modulation pattern at least in the direction of the detected light source. After generating the signal, the processor is configured to analyze the image data subsequently received to detect whether the light source has a modulation pattern corresponding to the modulation pattern of the exterior lights, and if the light source does have such a modulation pattern, the processor is configured to determine that the light source is a reflective object and not a light of another vehicle, and if the light source does not have such a modulation pattern, the processor is configured to determine that the light source may be a light of another vehicle.

According to another aspect of the present invention, a method is provided for distinguishing between a light of another vehicle and a reflective object, comprising the steps of: providing an imager for use in a vehicle; imaging a scene external and forward of the vehicle and generating image data corresponding to the acquired images; receiving and analyzing the image data in a processor to detect the presence of a light source and to identify whether such light source is a light of another vehicle; when a light source is detected, generating a control signal to control exterior lights of the vehicle to temporarily modulate at least a portion of an illumination pattern projected from the exterior lights to have a particular modulation pattern at least in the direction of the detected light source; and after generating the control signal, analyzing the image data subsequently received to detect whether the light source has a modulation pattern corresponding to the modulation pattern of the exterior lights, and if the light source does have such a modulation pattern, determining that the light source is a reflective object and not a light of another vehicle, and if the light source does not have such a modulation pattern, determining that the light source may be a light of another vehicle.

According to another aspect of the present invention, a non-transitory computer readable medium is provided having stored thereon software instructions that, when executed by a processor within a vehicle, cause the processor to distinguish between a light of another vehicle and a reflective object, by executing the steps comprising: controlling an imager to image a scene external and forward of the vehicle and generate image data corresponding to the acquired images; receiving and analyzing the image data in a processor to detect the presence of a light source and to identify whether such light source is a light of another vehicle; when a light source is detected, generating a control signal to control exterior lights of the vehicle to temporarily modulate at least a portion of an illumination pattern projected from the exterior lights to have a particular modulation pattern at least in the direction of the detected light source; and after generating the control signal, analyzing the image data subsequently received to detect whether the light source has a modulation pattern corresponding to the modulation pattern of the exterior lights, and if the light source does have such a modulation pattern, determining that the light source is a reflective object and not a light of another vehicle, and if the light source does not have such a modulation pattern, determining that the light source may be a light of another vehicle.

These and other features, advantages, and objects of the present invention will be further understood and appreciated by those skilled in the art by reference to the following specification, claims, and appended drawings.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

Figure 1:
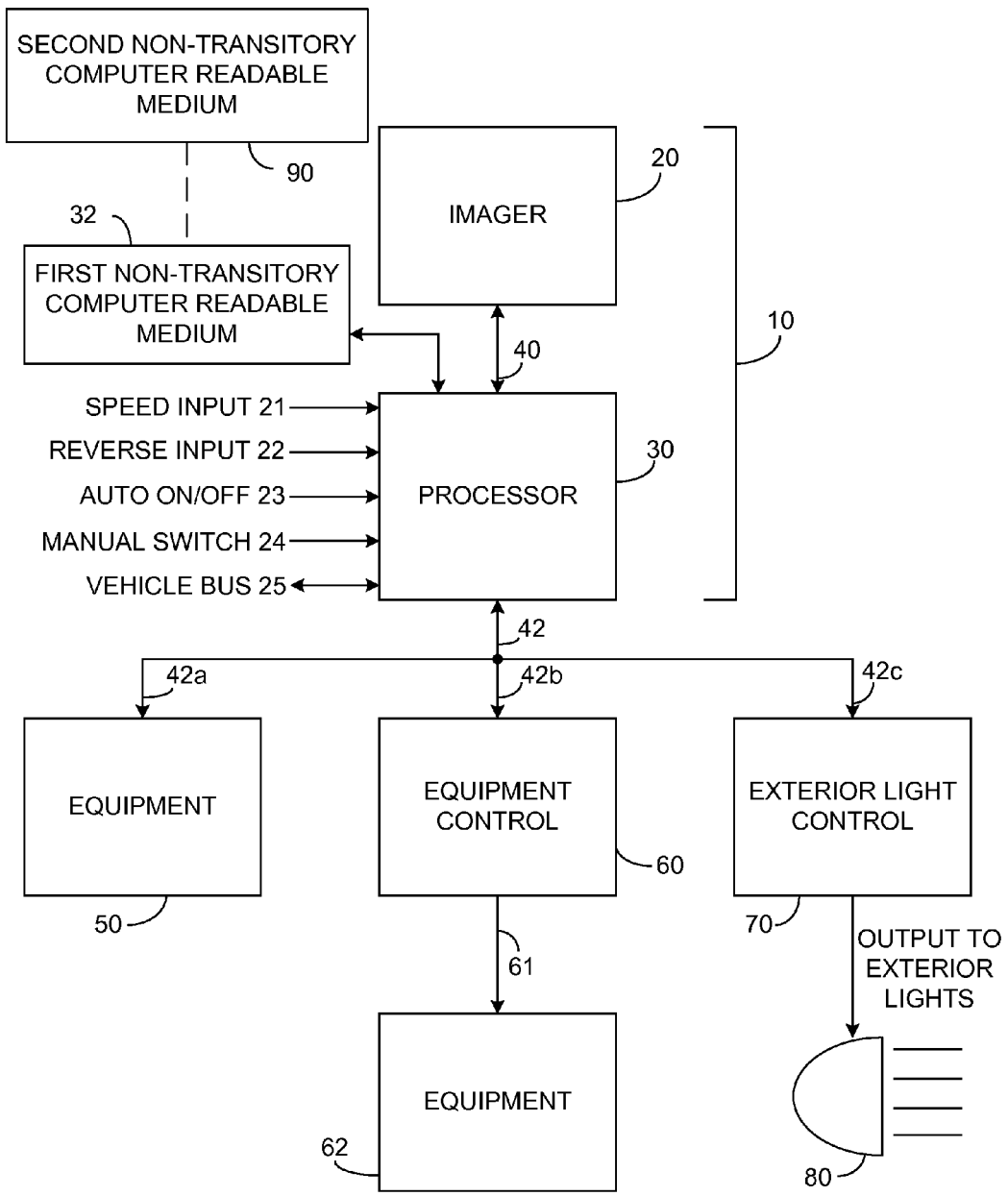
FIG. 1 is a block diagram of a system constructed according to one embodiment.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system for a vehicle and a method of detecting and/or categorizing objects in a scene forward of the vehicle. To assist in the understanding of an application of these embodiments, examples are provided that pertain to the use of the imaging system in an exterior light control system for controlling exterior lights of a controlled vehicle in response to image data acquired from an image sensor, which captures images forward of the vehicle. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high-beam state (or some state other than a low-beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

One of the challenges for such systems is to distinguish reflective road signs and roadside reflectors from headlamps of oncoming vehicles. If the system were unable to accurately detect such signs and reflectors, it would respond to detection of a sign or reflector in the same way it would respond to an oncoming vehicle and would reduce its illumination level or pattern when it does not need to be reduced. Such unnecessary reduction in illumination levels or patterns can be a distraction and a nuisance to the driver.

One approach that has been used to distinguish road signs is to select a brightness threshold that falls between a brightness level of typical oncoming headlamp brightness at the distance at which the system should respond and the brightness level of reflections from a typical road sign, which is generally less bright than the oncoming headlamps. One problem with the method of selecting a brightness threshold to distinguish between road signs and oncoming headlamps is that newer and brighter LED and laser headlamps cause reflections off of road signs that are above the brightness threshold. The embodiments described herein provide an improvement to this approach to address this problem.

Another approach used to distinguish road signs is disclosed in U.S. Pat. No. 5,837,994, which discloses a light control system that would initially dim the headlamps in response to any bright object and then detect any resulting dimming of the object that would be indicative of a dimmed reflection from a road sign. U.S. Pat. No. 6,587,573 discloses pulsing LED headlamps to detect a corresponding pulsed reflection from road signs. One problem with these approaches is that it would be possible that another vehicle with pulsed headlamps could be mistaken for reflections from a road sign. Other approaches include using object size and motion analysis to distinguish signs from oncoming vehicles.

U.S. Pat. No. 8,543,254 discloses an exterior light control system that improves upon the prior systems by determining a road model based on the roadway width and roadway type (i.e., motorway, two-lane road, multi-lane road, etc.) in order to more accurately discriminate between other vehicles and non-vehicle light sources, reflectors, and road signs and to allow different modes of operation depending upon the type of roadway on which the controlled vehicle is traveling. More specifically, the roadway width may be estimated from various objects detected in the forward scene, including lane markers, reflectors, road signs, and any other objects that may be useful to detect the edges of the road. The roadway type may be determined from the roadway width. Other vehicle parameters such as vehicle speed, yaw, roll, steering wheel position and vehicle direction may also be used when determining the roadway type and the road model. Then, using the road model, the system may track the positioning (or "world positioning") relative to the controlled vehicle, the movement, the brightness, the size, the color, and other characteristics of various detected light sources to determine if the light sources appear to be on the roadway. If so, the light sources are more likely to be another vehicle to which the system responds by appropriately controlling the exterior lights.

Ideally, a light control system takes into account all of these approaches to distinguishing between vehicles and nonvehicle light sources and may calculate a probability that a particular light source is a vehicle based upon various detected characteristics. A more detailed description of the manner in which the present system distinguishes vehicles from road signs is described further below following a description of the structure of the system.

A first embodiment of an imaging system 10 is shown in FIG. 1. Imaging system 10 may be provided for controlling exterior lights 80 and, optionally, other equipment (50, 62) of a vehicle. System 10 includes an imager 20 and a processor 30. Imager 20 includes an image sensor (201, FIG. 2) that is configured to image a scene external and forward of the controlled vehicle and to generate image data corresponding to the acquired images. Processor 30 receives and analyzes the image data to detect objects in the forward scene, and wherein the analysis of the image data performed by processor 30 may further include categorizing objects detected in the image data. If used in an exterior light control system, processor 30 may generate an exterior light control signal that may be used to control exterior lights 80 and may generate control signals to control any additional equipment (50, 62). These control signals are generated in response to analysis of the image data.

If imaging system 10 is used in a vehicle equipment control system, processor 30 may be configured to directly connect to the equipment (50) being controlled such that the generated control signals directly control the equipment. Alternatively, processor 30 may be configured to connect to an equipment control (60 and 70), which, in turn, is connected to the equipment being controlled (62 and 80) such that the control signals generated by processor 30 only indirectly control the equipment. For example, in the case of the equipment being exterior lights 80, processor 30 may analyze the image data from imager 20 so as to generate control signals that are more of a recommendation for an exterior light control 70 to use when controlling exterior lights 80. Thus, it can be said that the control signals are used to control the equipment. The control signals may further include not just a recommendation, but also a code representing a reason for the recommendation so that equipment controls 60 and 70 may determine whether or not to override a recommendation.

As shown in FIG. 1, various inputs (such as inputs 21-24) may be provided to processor 30 that may be taken into account in analyzing the image data or forming a recommendation or direct control signal. In some cases, such inputs may instead be provided to equipment control (60 and 70). For example, input from manual switches may be provided to equipment control (60 and 70), which may allow equipment control (60 and 70) to override a recommendation from processor 30. It will be appreciated that various levels of interaction and cooperation between processor 30 and equipment controls (60 and 70) may exist. One reason for separating control functions is to allow imager 20 to be located in the best location in the vehicle for obtaining images, which may be a distance from the equipment to be controlled and to allow communication over the vehicle bus 25.

According to one embodiment, the equipment that system 10 controls may include one or more exterior lights 80 and the control signal generated by processor 30 may be an exterior light control signal. In this embodiment, exterior lights 80 may be controlled directly by processor 30 or by an exterior light control 70, which receives a control signal from processor 30. As used herein, the "exterior lights" broadly include any exterior lighting on the vehicle. Such exterior lights may include headlamps (both low and high beam if separate from one another), tail lights, foul weather lights (such as fog lights), brake lights, center-mounted stop lights (CHMSLs), turn signals, and back-up lights, etc. The exterior lights may be operated in several different modes including conventional low-beam and high-beam states. They may also be operated as daytime running lights, and additionally as super-bright high beams in those countries where they are permitted.

The brightness of the exterior lights may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imager 20 may be any conventional system. Examples of suitable imagers are disclosed in published United States Patent Application Publication Nos. US 20080192132 A1 and US 20120072080 A1, and in United States Provisional Application Nos. 61/500,418 entitled "MEDIAN FILTER" filed on Jun. 23, 2011, by Jon H. Bechtel et al.; 61/544,315 entitled "MEDIAN FILTER" filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imager 20 includes an image sensor (or camera) to capture images that may then be displayed and/or analyzed in order to detect and optionally categorize objects or to optionally control vehicle equipment such as exterior lights 80. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994, 5,990, 469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512, 213 entitled "RAISED LANE MARKER DETECTION SYSTEM AND METHOD THEREOF" filed on Jul. 27, 2011, by Brock R. Rycenga et al., and 61/512,158 entitled "COLLISION WARNING SYSTEM AND METHOD THEREOF" filed on Jul. 27, 2011, by Brock R. Rycenga et al., which together correspond to published United States Patent Application Publication No. US 2013/0028473 A1, the entire disclosures of which are incorporated herein by reference.

In the example shown in FIG. 1, imager 20 may be controlled by processor 30. Communication of imager parameters as well as image data occurs over communication bus 40, which may be a bi-directional serial bus, parallel bus, a combination of both, or other suitable means. Processor 30 serves to perform equipment control functions by analyzing images from imager 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Processor 30 may control the imager 20 to be activated in several different modes with different exposure times and different readout windows. Processor 30 may be used to both perform the equipment or exterior light control function and control the parameters of imager 20.

Processor 30 can also take advantage of the availability of signals (such as vehicle speed and yaw) communicated via discrete connections or over the vehicle bus 25 in making decisions regarding the operation of the exterior lights 80. In particular, speed input 21 provides vehicle speed information to the processor 30 from which speed can be a factor in determining the control state for the exterior lights 80 or other equipment. The reverse signal 22 informs processor 30 that the vehicle is in reverse, responsive to which the processor 30 may clear an electrochromic mirror element regardless of signals output from light sensors. Auto ON/OFF switch input 23 is connected to a switch having two states to dictate to processor 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Processor 30 can control, at least in part, other equipment 50 within the vehicle which is connected to processor 30 via vehicle bus 42. Specifically, the following are some examples of one or more equipment 50 that may be controlled by processor 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, processor 30 may be, at least in part, located within a rearview assembly of a vehicle or located elsewhere within the vehicle. The processor 30 may also use a second processor (or processors) such as equipment control 60, which may be located in a rearview assembly or elsewhere in the vehicle in order to control certain kinds of equipment 62. Equipment control 60 can be connected to receive via vehicle bus 42 control signals generated by processor 30. Equipment control 60 subsequently communicates and controls equipment 62 via bus 61. For example, equipment control 60 may be a windshield wiper control unit which controls windshield wiper equipment, turning this equipment ON or OFF. Equipment control 60 may also be an electrochromic mirror control unit where processor 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with processor 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation system, a vehicle speed warning, interior lights, rearview mirrors, an audio system, a climate control, an engine control, and various other switches and other display devices that may be located throughout the vehicle.

Figure 2:
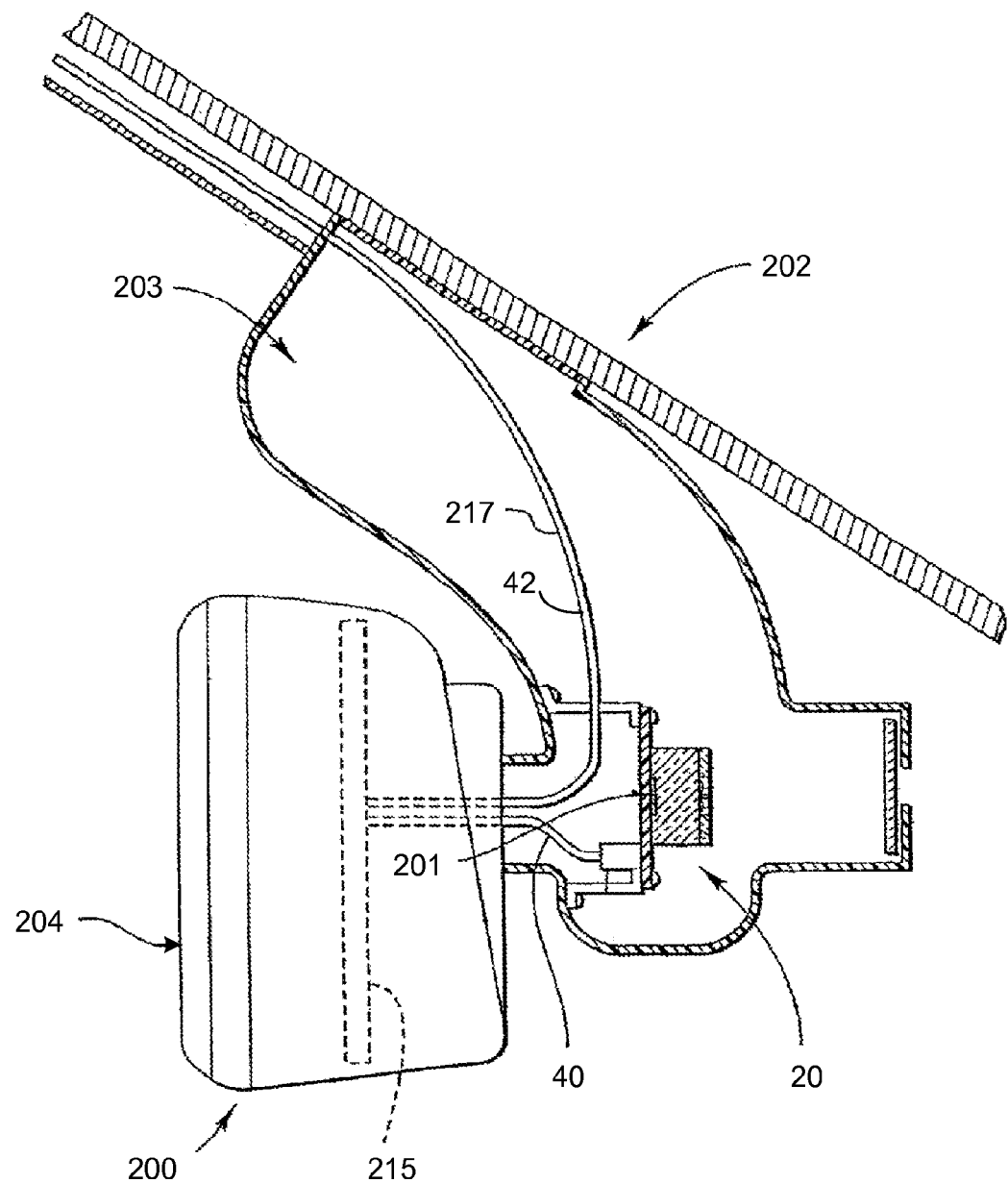
FIG. 2 is a partial cross section of a rearview assembly incorporating the system of FIG. 1.

Portions of system 10 can be advantageously integrated into a rearview assembly 200 as illustrated in FIG. 2, wherein imager 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imager 20 in the rearview assembly 200 permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor 201 with the exception of an aperture through which light is received from a forward external scene.

Processor 30 of FIG. 1 may be provided on a main circuit board 215 and mounted in rearview housing 204 as shown in FIG. 2. As discussed above, processor 30 may be connected to imager 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

Figure 3:
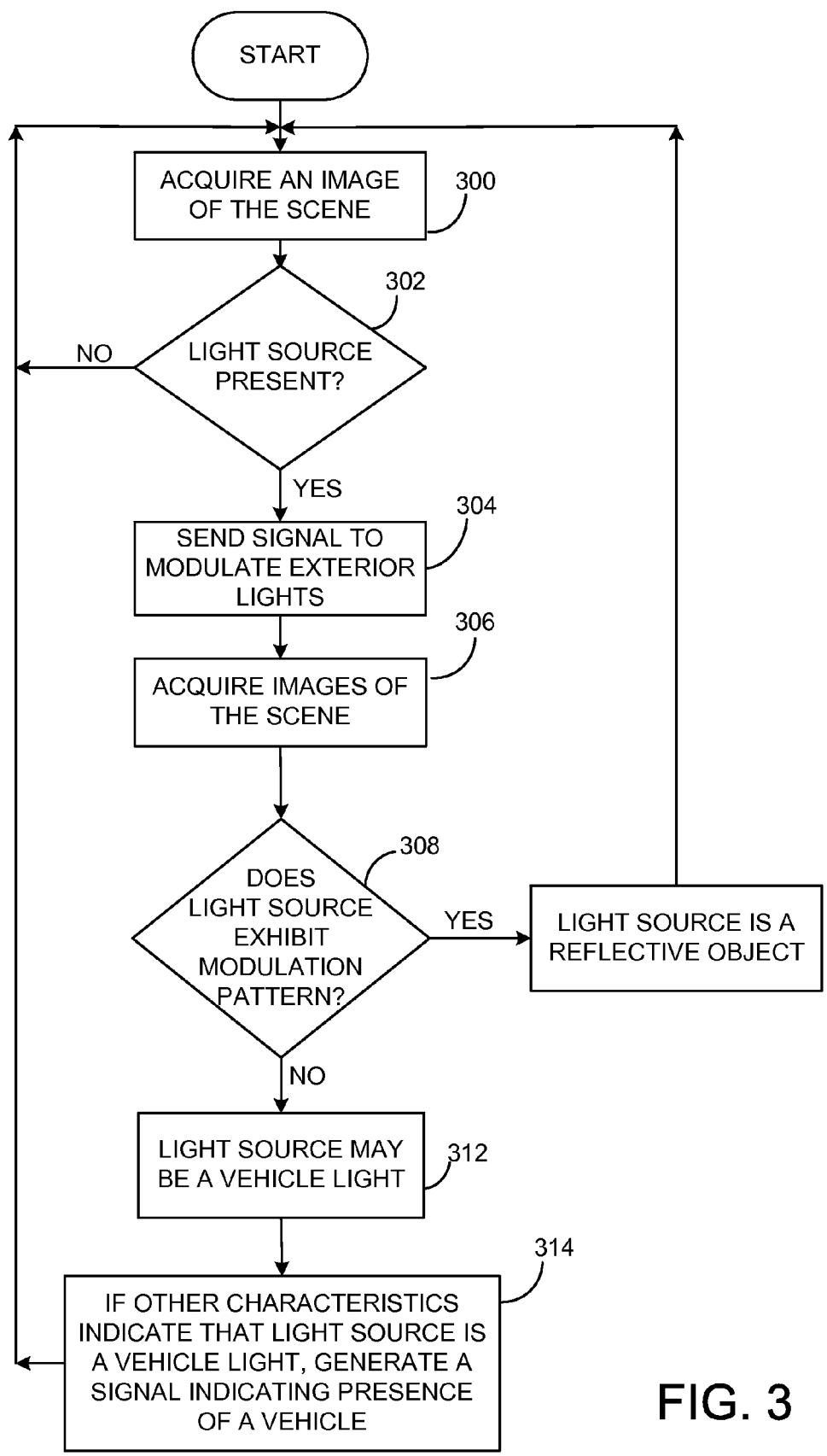
FIG. 3 is a flow chart illustrating the steps of a method for distinguishing between lights of another vehicle and reflective objects.

The method for distinguishing between lights of another vehicle and reflective objects will now be described with respect to FIG. 3. This method is described below as being implemented by processor 30 using image data received from imager 20. This method may be a subroutine executed by any processor, and thus this method may be embodied in a non-transitory tangible computer readable medium having stored thereon software instructions that, when executed by a processor 30, cause the processor 30 to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of processor 30 (or locally associated with processor 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

Processor 30 is programmed to perform the methods of the current embodiment. Processor 30 may include a processor, such as a microprocessor, and/or other circuitry that is capable of combining to perform the methods described below. Specifically, with reference to FIG. 3, processor 30 is configured to receive and analyze the image data (step 300) to detect the presence of light source (step 302). When processor 30 detects a light source, the processor generates a control signal to control the exterior lights 80 of the controlled vehicle to temporarily modulate at least a portion an illumination pattern projected from the exterior lights 80 to have a particular modulation pattern at least in the direction of the detected light source (step 304). After generating the control signal, processor 30 acquires additional images (step 306) and analyzes the image data subsequently received to detect whether the light source has a modulation pattern corresponding to the modulation pattern of the exterior lights (step 308). If the light source does have such a modulation pattern, processor 30 determines that the light source is a reflective object (step 310) and not another vehicle. If the light source does not have such a modulation pattern, processor 30 determines that the light source may be a vehicle (step 312). If the imaging system 10 is used to control vehicle equipment, such as exterior lights 80, processor 30 may execute the optional step 314 of generating a signal indicating the presence of a vehicle if other characteristics of the light source indicate that the light source is a vehicle light. Such other characteristics may include any known characteristics such as motion, location, and brightness, for example.

The modulation pattern used to modulate the exterior lights 80 may be a unique modulation pattern to the controlled vehicle. By making the modulation pattern unique to each vehicle, there is less chance that processor 30 will sense a modulation pattern of another vehicle and falsely identify the other vehicle as a road sign. The modulation pattern may be either a random or a pseudorandom pattern where a seed value is used that corresponds to one of: select digits from a vehicle identification number (VIN) of the controlled vehicle, a time value corresponding to the time since a beginning of a current vehicle ignition cycle, and a number of frames captured since a beginning of a current vehicle ignition cycle.

Processor 30 may also be configured to analyze the image data subsequently received to detect whether the light source has a modulation pattern corresponding to the modulation pattern of the exterior lights 80 within a predetermined time window after the control signal was generated to modulate the exterior lights 80. In this way, if another vehicle detects the exterior lights 80 of the controlled vehicle and then modulates its headlamps, the processor of the controlled vehicle will not consider the modulated headlamps of the other vehicle to be a road sign if the modulated headlamps are outside of a time window where the modulated light would have been expected to be received following generation of the control signal that causes the controlled vehicle's exterior lights to commence modulation.

Depending upon the capabilities of the image sensor 201, it may be possible to detect whether a light source is an AC-powered light source by capturing images or portions of images at a rate that is a multiple of the rate at which AC-powered lights are modulated (120 Hz, 100 Hz, 60 Hz, or 50 Hz depending on the particular country in which the vehicle is operated). In other words, the number of frames captured per second may be selected to detect the AC modulation of such AC-powered light sources. Since vehicle headlamps are DC-powered, AC-powered lights can be readily distinguished from vehicle light sources. Newer LED headlamps are typically powered and controlled through pulse width modulation (PWM). Accordingly, by changing the PWM frequency, headlamps can be modulated with a modulation pattern that is a multiple of 120 Hz, 100 Hz, 60 Hz, or 50 Hz. Thus, the reflections from a road sign may be made to correspond to those of an AC-powered light source and processor 30 may distinguish road signs in the same manner as AC-powered street lights.

The form of modulation of the exterior lights 80 may depend upon the type of exterior lights that are used. Some LED and laser headlamps have individual LEDs/lasers or groups of LEDs/lasers that are used to illuminate different areas of the area in front of the vehicle. Each LED/laser or group of LEDs/lasers may be separately controlled. Thus, if a light source is detected near the side of the road or lane, only those LEDs/lasers responsible for illuminating the area where the light source is detected may be modulated with the modulation pattern so as to not be as noticeable to the driver or other drivers. Further, the modulation need not reduce the light from such LEDs/lasers to zero light emission, but may instead reduce the light by a certain degree. For example, if a PWM signal is used, the modulation pattern may reduce the light by changing the PWM from 100% to 75% or 50% or from 75% to 50% or 25%. The nature of the "modulation" of an LED or laser headlamp could take several forms. One form would be an actual encoding of high to low pulses that represent the code similar to how normal serial data is transmitted. Another, easier to realize approach would be to have the duty cycle of the PWM (which may be between 200 Hz and 1000 Hz, often 500 Hz) go from a relatively high percentage (say >75%) to a low duty cycle (<25%). The low section of the pulse would be long enough to be detected with an appropriate exposure (a few milliseconds) and then it would return to the high duty cycle. The gap in time between the pulses would be relative to the "code" so processor 30 would just measure the time between low pulses and verify it matched the code instead of measuring all the high to low transitions and durations that would be needed to actually encode the code serially. The second form would also be much easier to sync to.

In the case where processor 30 indirectly controls the exterior lights 80 by sending a signal over the CAN bus to an exterior light control 70, there is a delay from the time that the control signal is generated by processor 30 until the exterior lights 80 begin to modulate in accordance with the modulation pattern. This delay varies from one car model to another car model. The delay is typically less than about 50 milliseconds. Because of this delay, processor 30 may be programmed to wait for this delay period to pass after the control signal is generated before looking for the presence of the modulation pattern in a sensed light source. The amount of delay may be programmed into processor 30 depending upon the model vehicle in which the system is installed.

In the event that processor 30 directly controls the exterior lights 80, it is possible that the modulation of the exterior lights 80 may be synchronized with the camera frame rate so that the modulation will be in phase with the camera frame rate. Because it is unlikely that an oncoming vehicle that is also modulating its exterior lights 80 is modulating in phase with the imager of the controlled vehicle, processor 30 can distinguish reflective road signs from oncoming vehicles.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system for a vehicle, comprising:
an imager configured to image a scene external and forward of the vehicle and to generate image data corresponding to acquired images; and
a processor configured to receive and analyze the image data to detect the presence of a light source and to identify whether such light source is a light of another vehicle;
wherein:
when a light source is detected, said processor is configured to generate a signal that is used to control exterior lights of the vehicle to temporarily modulate at least a portion of an illumination pattern projected from the exterior lights to have a particular modulation pattern at least in the direction of the detected light source,
after generating the signal, said processor is configured to analyze the image data subsequently received to detect whether the light source has a modulation pattern corresponding to the modulation pattern of the exterior lights,
when the light source does have such a modulation pattern, said processor is configured to determine that the light source is a reflective object and not a light of another vehicle, and
when the light source does not have such a modulation pattern, said processor is configured to determine that the light source may be a light of another vehicle.

2. The imaging system of claim 1, wherein the modulation pattern used to modulate the exterior lights is a unique modulation pattern to the vehicle.

3. The imaging system of claim 1, wherein the modulation pattern is one of a random and a pseudorandom pattern.

4. The imaging system of claim 3, wherein the pseudorandom modulation pattern is selected using a seed value corresponding to one of: select digits from a VIN of the vehicle, a time value corresponding to the time since a beginning of a current vehicle ignition cycle, and a number of frames captured since a beginning of a current vehicle ignition cycle.

5. The imaging system of claim 1, wherein said processor analyzes the image data subsequently received to detect whether the light source has a modulation pattern corresponding to the modulation pattern of the exterior lights within a predetermined time window after a control signal was generated to modulate the exterior lights.

6. The imaging system of claim 1, wherein the exterior lights are modulated at a frequency that is a multiple of at least one of 120 Hz, 100 Hz, and 50 Hz, and wherein said processor treats any light sources having a modulation pattern that is a multiple of at least one of 120 Hz, 100 Hz, and 50 Hz as nonvehicle light sources.

7. The imaging system of claim 1, wherein said processor is configured to generate additional signals that are used to control the exterior lights in response to determinations that a light of another vehicle is present or a determination that another vehicle is no longer present.

8. A method for distinguishing between a light of another vehicle and a reflective object, comprising:
   providing an imager for use in a vehicle;
   imaging a scene external and forward of the vehicle and generating image data corresponding to the acquired images;
   receiving and analyzing the image data in a processor to detect the presence of a light source and to identify whether such light source is a light of another vehicle;
   when a light source is detected, generating a control signal to control exterior lights of the vehicle to temporarily modulate at least a portion of an illumination pattern projected from the exterior lights to have a particular modulation pattern at least in the direction of the detected light source;
   after generating the control signal, analyzing the image data subsequently received to detect whether the light source has a modulation pattern corresponding to the modulation pattern of the exterior lights;
   when the light source does have such a modulation pattern, determining that the light source is a reflective object and not a light of another vehicle; and
   when the light source does not have such a modulation pattern, determining that the light source may be a light of another vehicle.

9. The method of claim 8, wherein the modulation pattern used to modulate the exterior lights is a unique modulation pattern to the vehicle.

10. The method of claim 8, wherein the modulation pattern is one of a random and a pseudorandom pattern.

11. The method of claim 10, wherein the pseudorandom modulation pattern is selected using a seed value corresponding to one of: select digits from a VIN of the vehicle, a time value corresponding to the time since a beginning of a current vehicle ignition cycle, and a number of frames captured since a beginning of a current vehicle ignition cycle.

12. The method of claim 8, wherein the step of analyzing the image data subsequently received to detect whether the light source has a modulation pattern corresponding to the modulation pattern of the exterior lights is performed within a predetermined time window after the control signal was generated to modulate the exterior lights.

13. The method of claim 8, wherein the exterior lights are modulated at a frequency that is a multiple of at least one of 120 Hz, 100 Hz, 60 Hz, and 50 Hz, and wherein said processor treats any light sources having a modulation pattern that is a multiple of at least one of 120 Hz, 100 Hz, 60 Hz, and 50 Hz as nonvehicle light sources.

14. A non-transitory computer readable medium having stored thereon software instructions that, when executed by a processor within a vehicle, cause the processor to distinguish between a light of another vehicle and a reflective object, by executing the steps comprising:
   controlling an imager to image a scene external and forward of the vehicle and generate image data corresponding to the acquired images;
   receiving and analyzing the image data in a processor to detect the presence of a light source and to identify whether such light source is a light of another vehicle;
   when a light source is detected, generating a control signal to control exterior lights of the vehicle to temporarily modulate at least a portion of an illumination pattern projected from the exterior lights to have a particular modulation pattern at least in the direction of the detected light source;
   after generating the control signal, analyzing the image data subsequently received to detect whether the light source has a modulation pattern corresponding to the modulation pattern of the exterior lights;
   when the light source does have such a modulation pattern, determining that the light source is a reflective object and not a light of another vehicle; and
   when the light source does not have such a modulation pattern, determining that the light source may be a light of another vehicle.

15. The non-transitory computer readable medium of claim 14, wherein the modulation pattern used to modulate the exterior lights is a unique modulation pattern to the vehicle.

16. The non-transitory computer readable medium of claim 14, wherein the modulation pattern is one of a random and a pseudorandom pattern.

17. The non-transitory computer readable medium of claim 16, wherein the pseudorandom modulation pattern is selected using a seed value corresponding to one of: select digits from a VIN of the vehicle, a time value corresponding to the time since a beginning of a current vehicle ignition cycle, and a number of frames captured since a beginning of a current vehicle ignition cycle.

18. The non-transitory computer readable medium of claim 14, wherein the step of analyzing the image data subsequently received to detect whether the light source has a modulation pattern corresponding to the modulation pattern of the exterior lights is performed within a predetermined time window after the control signal was generated to modulate the exterior lights.

19. The non-transitory computer readable medium of claim 14, wherein the exterior lights are modulated at a frequency that is a multiple of at least one of 120 Hz, 100 Hz, 60 Hz, and 50 Hz, and wherein said processor treats any light sources having a modulation pattern that is a multiple of at least one of 120 Hz, 100 Hz, 60 Hz, and 50 Hz as nonvehicle light sources.

20. The non-transitory computer readable medium of claim 14, wherein the software instructions further cause the processor to generate an exterior light control signal that is used to control the exterior lights in response to determinations that a light of another vehicle is present or a determination that another vehicle is no longer present.

* * * * *